United States Patent
Imbourg et al.

(10) Patent No.: US 7,004,721 B2
(45) Date of Patent: Feb. 28, 2006

(54) ANNULAR PLATFORM FOR A NOZZLE OF A LOW-PRESSURE TURBINE OF A TURBOMACHINE

(75) Inventors: Sébastien Imbourg, Yerres (FR); Jean-Luc Soupizon, Vaux le Penil (FR); Philippe Pabion, Vaux le Penil (FR); Jean-Michel Guimbard, Perthes (FR)

(73) Assignee: Snecma Moteurs, Paris (FR)

( * ) Notice: Subject to any disclaimer, the term of this patent is extended or adjusted under 35 U.S.C. 154(b) by 85 days.

(21) Appl. No.: 10/777,747

(22) Filed: Feb. 13, 2004

(65) Prior Publication Data

US 2004/0161336 A1    Aug. 19, 2004

(30) Foreign Application Priority Data

Feb. 14, 2003  (FR)  ................................. 03 01841

(51) Int. Cl.
*F04D 25/12* (2006.01)
(52) U.S. Cl. ...................... 415/115; 415/191; 415/211.2
(58) Field of Classification Search ............... 415/115, 415/191, 208.2, 211.2
See application file for complete search history.

(56) References Cited

U.S. PATENT DOCUMENTS

| 3,446,481 A | | 5/1969 | Kydd | |
|---|---|---|---|---|
| 4,187,054 A | * | 2/1980 | Landis et al. | 415/115 |
| 5,217,347 A | * | 6/1993 | Miraucourt et al. | 415/115 |
| 6,227,798 B1 | | 5/2001 | Demers et al. | |
| 6,394,749 B1 | * | 5/2002 | Yu et al. | 415/115 |

FOREIGN PATENT DOCUMENTS

EP           0 698 723            2/1996

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

An annular platform for the nozzle of a low-pressure turbine in a turbomachine, said nozzle having a longitudinal axis and comprising at least one fixed vane disposed downstream from at least one moving blade of a high-pressure turbine, said platform comprising a downstream portion supporting said fixed vane radially defining an aerodynamic channel which extends longitudinally between a leading edge of said fixed vane and a trailing edge of said moving blade, said platform further comprising an upstream portion extending longitudinally beyond the leading edge of said fixed vane towards the trailing edge of said moving blade so as to lengthen said aerodynamic channel.

20 Claims, 3 Drawing Sheets

ANNULAR PLATFORM FOR A NOZZLE OF A LOW-PRESSURE TURBINE OF A TURBOMACHINE

BACKGROUND OF THE INVENTION

The present invention relates to the general field of nozzles for low-pressure turbines of turbomachines. More particularly it relates to a top platform and to a bottom platform serving as supports for the fixed vanes of such nozzles.

In a turbomachine, the nozzle of the low-pressure turbine is disposed downstream from the high-pressure turbine in the flow direction of the gas passing through the turbomachine. FIG. 5 is a diagram showing the junction between the high- and low-pressure turbines in a conventional turbomachine. In this figure, the high-pressure turbine 100 has a row of moving blades 102 spaced apart circumferentially around a longitudinal axis 104 of the turbine. As represented by arrow 106, the flow of gas leaving the high-pressure turbine flows towards the nozzle 108 of the low-pressure turbine. The nozzle is constituted in particular by a plurality of fixed vanes 110 extending radially between a top annular platform 112 and a bottom annular platform 114 acting as supports. These fixed vanes 110, which are likewise spaced apart circumferentially around the longitudinal axis 104, serve to direct the flow of gas coming from the high-pressure turbine at an appropriate angle and at an appropriate speed. The inside surfaces 116, 118 of the top and bottom platforms 112, 114 for supporting the fixed vanes 110 define between them an aerodynamic channel 120 through which the gas flows.

In order to improve the efficiency of the low-pressure turbine, it is known to lengthen the aerodynamic channel for the flow of gas passing through the turbine by spacing the leading edges of the fixed vanes of the low-pressure turbine apart from the trailing edges of the moving blades of the high-pressure turbine. Nevertheless, that configuration requires the aerodynamic channel to be made continuous upstream from the platforms so as to limit head losses between the high-pressure turbine and the nozzle. A known solution to that problem consists in providing the platforms of the low-pressure turbine nozzle with ferrules extending upstream in line with the bottom and top platforms. These ferrules are generally fixed to a casing of the turbomachine via bolt fasteners. That solution nevertheless presents drawbacks associated in particular with the undesirable extra weight represented by such ferrules and their connections. In addition, in the absence of any specific cooling system, those ferrules tend to heat up quickly which degrades the mechanical behavior and the quality of continuity in the aerodynamic channel. In practice, the mechanical behavior of the ferrules is observed to deteriorate quickly and steps are seen to be formed in the inside surfaces thereof, which steps are particularly harmful in terms of the efficiency and the lifetime of the low-pressure turbine.

OBJECT AND BRIEF SUMMARY OF THE INVENTION

The present invention thus seeks to mitigate such drawbacks by proposing a nozzle platform that enables the aerodynamic channel for gas flow to be lengthened without degrading the mechanical behavior and the efficiency of the nozzle.

To this end, the invention provides an annular platform for the nozzle of a low-pressure turbine in a turbomachine, said nozzle having a longitudinal axis and comprising at least one fixed vane disposed downstream from at least one moving blade of a high-pressure turbine, said platform comprising a downstream portion supporting said fixed vane and radially defining an aerodynamic channel which extends longitudinally between a leading edge of said fixed vane and a trailing edge of said moving blade, said platform further comprising an upstream portion extending longitudinally beyond the leading edge of said fixed vane towards the trailing edge of said moving blade so as to lengthen said aerodynamic channel.

The platform and its upstream portion extending beyond the leading edges of the fixed vanes are made as a single piece. As a result, it is possible to lengthen the aerodynamic channel for gas flow without adding weight that is harmful to the operation of the nozzle. Such a platform can equally well be a top platform or a bottom platform of the nozzle.

According to an advantageous characteristic of the invention, the upstream portion of the platform includes a specific cooling circuit serving to make its temperature uniform and to decrease the temperature gradient in the platform. Such a cooling circuit serves in particular to avoid any discontinuity being formed in the aerodynamic channel. The lifetime and the efficiency of the nozzle are thus unaffected by lengthening the aerodynamic channel for the flow of gas passing through the machine.

Preferably, said cooling circuit includes at least one cooling cavity extending longitudinally between an upstream end of said platform and the leading edge of the fixed vane. The cooling circuit further comprises air feed and air exhaust means for the cavity. The means for exhausting air from the cavity include at least one hole opening out into the cavity and leading to the outside of the platform.

When the platform constitutes a nozzle top platform, the air feed means comprise at least one orifice opening out into an air manifold for cooling the fixed vanes and leading into the orifice. Preferably, these air feed means comprise at least two orifices having different angles of inclination so as to distribute the cooling air uniformly within the cavity.

When the platform constitutes a nozzle bottom platform, the air feed means comprise an orifice passing through the bottom platform for exhausting cooling air from the fixed vane. The bottom platform preferably further comprises at least one deflector disposed parallel to the upstream portion of the platform so as to form an annular cooling channel between the deflector and the platform.

BRIEF DESCRIPTION OF THE DRAWINGS

Other characteristics and advantages of the present invention appear from the following description given with reference to the accompanying drawings which show an embodiment that has no limiting character. In the figures.

DETAILED DESCRIPTION OF AN EMBODIMENT

Figure 1:
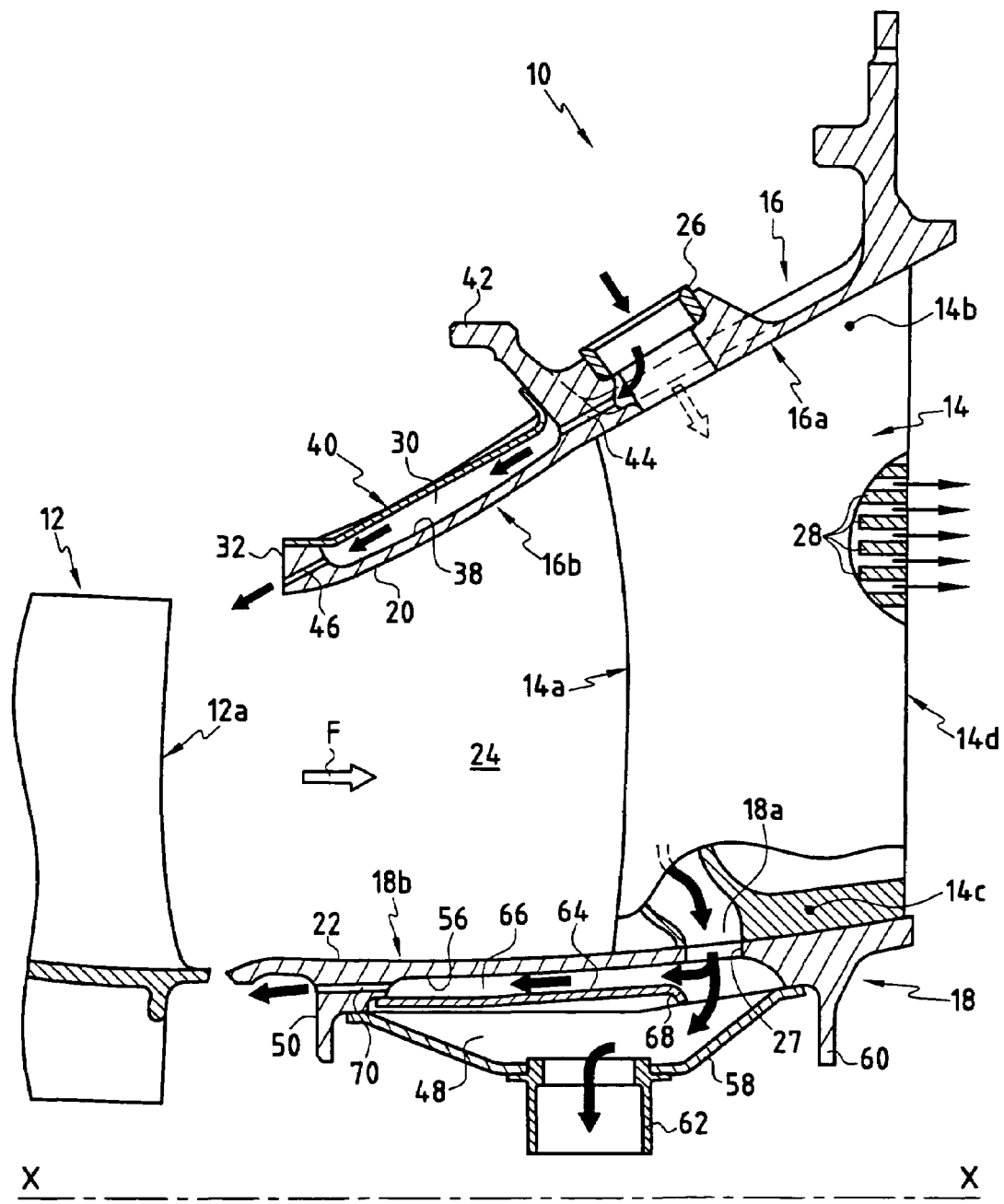
FIG. 1 is a fragmentary longitudinal section view of a low-pressure turbine nozzle including a top platform and a bottom platform in accordance with the invention.

FIG. 1 is a fragmentary longitudinal section view of a nozzle 10 of a low-pressure turbine of longitudinal axis X—X. The figure also shows a moving blade 12 of the high-pressure turbine disposed upstream from the nozzle 10. Naturally, the high-pressure turbine comprises a plurality of moving blades 12 whose trailing edges 12a are level with one another. The flow direction of the gas coming from the high-pressure turbine is represented by arrow F.

The nozzle 10 comprises a plurality of fixed vanes 14 spaced apart circumferentially around the longitudinal axis X—X of the low-pressure turbine. The fixed vanes 14 are disposed in the gas flow in such a manner that their leading edges 14a are level with one another. The radial top ends (or tips) 14b of the fixed vanes 14 are supported by a downstream portion 16a of an annular top platform 16. Similarly, the bottom radial ends (or bases) 14c of the fixed vanes are supported by a downstream portion 18a of an annular bottom platform 18. The bottom and top platforms may be made up of one or more adjacent annular segments forming a continuous circular surface. Thus, an annular segment of a top or bottom platform can serve to support one or more fixed vanes. In the description below, the term "platform" is used both for a single platform and for a platform segment.

The inside surfaces 20, 22 of the top and bottom platforms 16 and 18 define radially an aerodynamic flow channel 24 for the gas leaving the high-pressure turbine and passing through the nozzle of the low-pressure turbine. This aerodynamic channel is also defined longitudinally between the leading edge 14a of each fixed vane 14 of the low-pressure turbine and the trailing edge 12a of each moving blade 12 of the high-pressure turbine.

In the invention, in order to improve the performance of the low-pressure turbine while limiting head losses between the high-pressure turbine and the nozzle, the top and bottom platforms 16 and 18 have respective upstream walls 16b, 18b extending longitudinally in line with the downstream walls 16a, 18a beyond the leading edges 14a of the fixed vanes 14 towards the trailing edges 12a of the moving blades 12. These upstream portions, which are made integrally with the downstream portions of the platforms, thus serve to lengthen the aerodynamic channel 24.

More precisely, the upstream portions 16b, 18b of the top and bottom platforms 16 and 18 extend beyond the leading edges 14a of the fixed vanes 14 over a length that may exceed 80 millimeters (mm) for example. In addition, the top platform 16 slopes steeply radially away from the longitudinal axis X—X so as to increase the aerodynamic performance of the low-pressure turbine by rapidly increasing its mean radius. By way of example, the top platform may have an angle of inclination of about 30°.

According to an advantageous characteristic of the invention, the upstream wall 16b of the top platform 16 and/or the upstream wall 18b of the bottom platform 18 for supporting a fixed vane 14 include(s) a cooling circuit. Such a cooling circuit enables temperature gradients and mean temperature to be decreased in the inside surface 20 of the top platform 16 and/or the inside surface 22 of the bottom platform 18. In addition, this cooling circuit is fitted either to one or the other of the top and bottom platforms 16, 18 or to both of them.

The air feeding the cooling circuit of the top and/or bottom platforms 16 and/or 18 is advantageously taken from a conventional device for cooling the fixed vane 14. The fixed vanes of the nozzle 10 are generally fitted with respective cooling devices. Typically, air is taken from a zone of the turbomachine that is satisfactory in terms of pressure and temperature (e.g. from the high-pressure compressor), and is introduced into each fixed vane 14 of the nozzle via its tip 14b, and via a manifold 26 passing through the top platform 16 and leading to a cooling cavity (not shown in the figures) formed in the fixed vane and possibly receiving a liner. The air then flows inside the fixed vane 14 along a path defined by the cooling cavity prior to being exhausted through the base 14c of the vane via an orifice 27 passing through the bottom platform 18 and via the trailing edge 14d of the fixed vane via slots 28 or holes formed therethrough.

Figure 2:
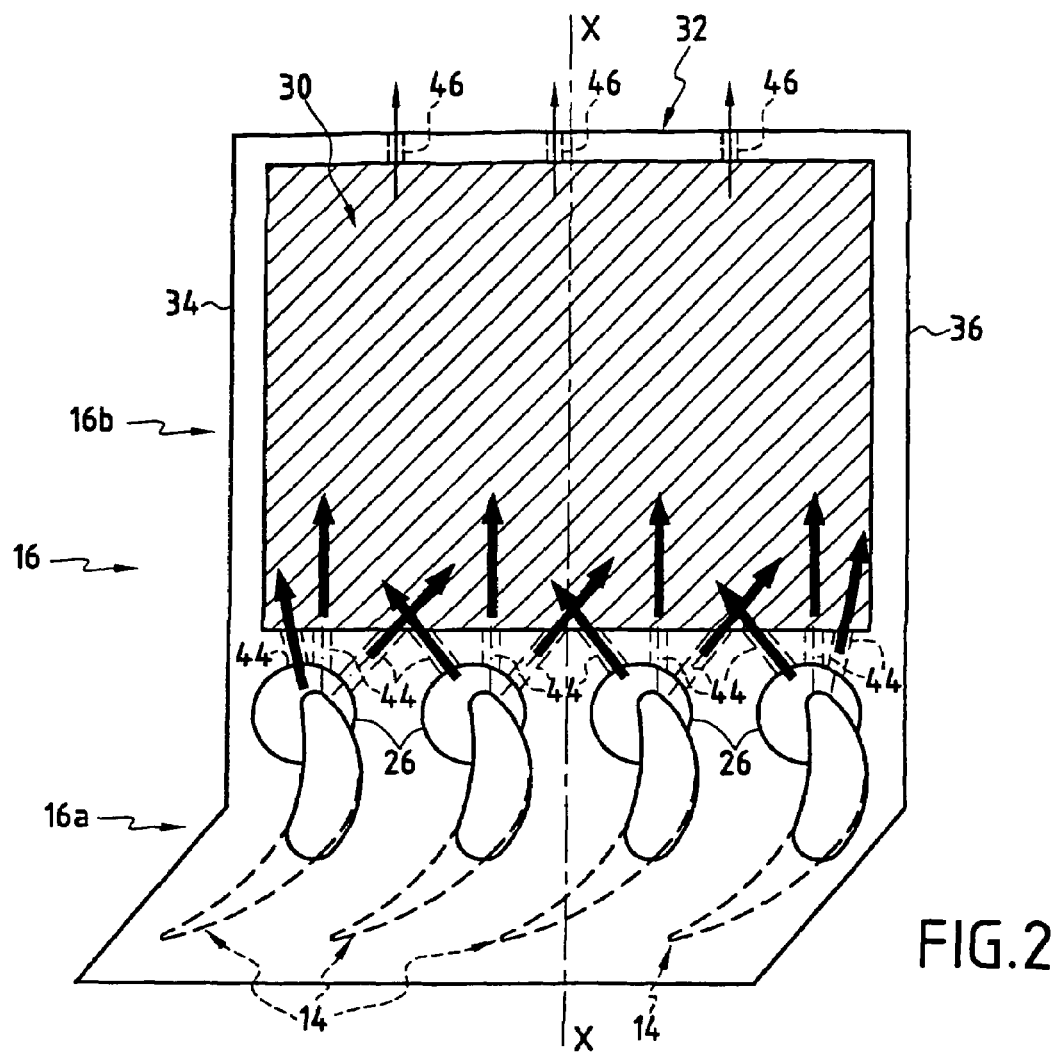
FIG. 2 is a plan view of a nozzle top platform of the invention.
Figure 5:
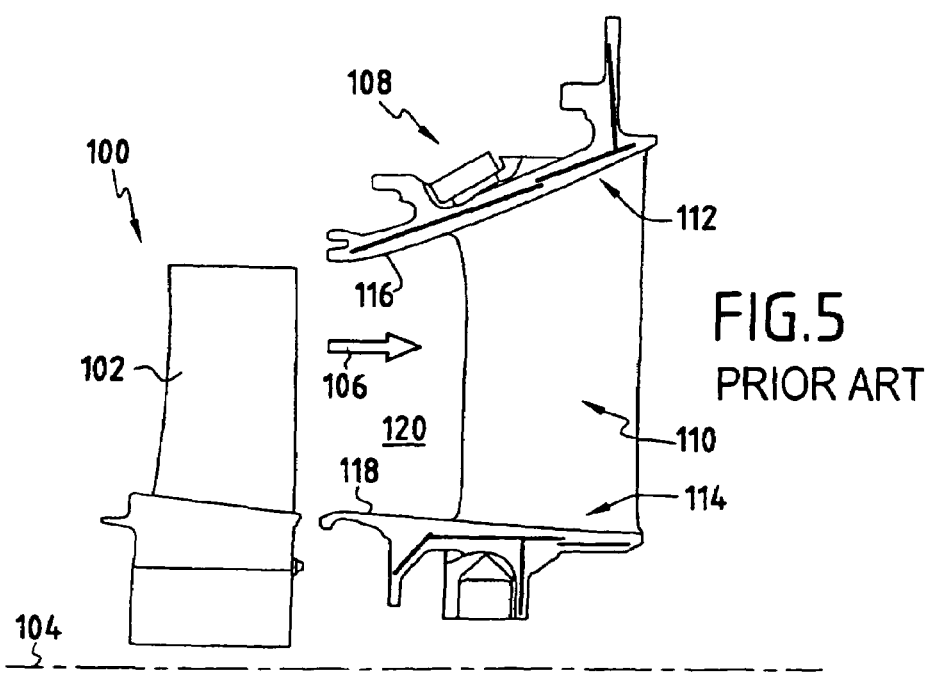
FIG. 5 is a longitudinal section view showing a conventional junction between a high-pressure turbine and a low-pressure turbine nozzle.

There follows a description of the cooling circuit suitable more particularly for fitting to the upstream portion 16b of the top platform 16 of the nozzle, with reference in particular to FIGS. 1 and 2.

The cooling circuit comprises in particular at least one cooling air flow cavity 30 which extends longitudinally along the upstream portion 16b of the top platform 16 between an upstream end 32 thereof and the leading edges 14a of the fixed vanes 14. In FIG. 2, the top platform 16 is a platform segment supporting four fixed vanes 14 and having a single cooling cavity 30. This cavity extends tangentially between the two tangential ends 34, 36 of the platform so that the cooling air present in said cavity covers a maximum area of the top platform. Nevertheless, it is possible to envisage the top platform having a plurality of cavities extending from the leading edges of the fixed vanes 14 to its upstream end 32. In which case, the tangential spacing between two adjacent cavities needs to be as small as possible so as to enable the cooling air to occupy a maximum area.

The cooling cavity 30 of the top platform can be obtained by forming a recess 38 in an outside portion of the platform, which recess is covered by a closure device. For example, the closure device may be a piece of sheet metal 40 brazed or welded to the upstream and tangential ends 32, 34, and 36 of the platform and to a hook 42 of the top platform which is used for attaching it to a casing of the turbomachine (not shown in the figures). In a variant embodiment (not shown), the cooling cavity 30 may alternatively be obtained directly by casting. In this case, the top platform is made by casting and the location of the or each cavity 30 is occupied by a soluble core placed in a mold prior to casting the metal. Furthermore, it can be necessary to provide the cavity 30 with baffles (not shown in the figures) disposed perpendicularly to the air flow direction in the cavity so as to increase heat exchange between the cooling air and the platform.

In order to feed the cooling cavity 30 of the top platform 16 with air, provision is made to bleed off a fraction of the air feeding the cooling device of the fixed vane 14 via at least one orifice 44 opening out into the cooling air manifold 26 of the fixed vane and leading to the cavity 30. As shown in FIG. 1, the manifold 26 may be constituted, for example, by a bushing for reducing any risk of leakage and for optimizing air flow. The orifice 44 is calibrated so as to ensure that air flows regularly in the cavity 30. It should also be observed that this orifice may advantageously be formed level with the hook 42 of the top platform for connecting the top platform to a casing of the turbomachine. The air passing through the orifice thus also serves to cool such a hook.

According to an advantageous characteristic of the invention, in order to distribute the cooling air uniformly in the cavity and thus avoid forming temperature gradients that are harmful for the lifetime of the platform, a plurality of orifices 44 can be provided for each fixed vane 14, these orifices having different angles of inclination relative to a longitudinal axis of the top platform. Using as an example the embodiment shown in FIG. 2, the top platform 16 thus has three orifices 44 for each fixed vane 14, the three orifices 44 having different angles of inclination.

The air taken in this way via the orifice(s) 44 flows into the cooling cavity 30 of the top platform 16 prior to being exhausted or purged via at least one hole 46 (three holes in FIG. 2) opening out into the cavity and leading to the outside of the platform. The hole(s) 46 is/are formed in the upstream end 32 of the top platform. The holes are likewise calibrated so as to ensure a regular rate of air flow in the cavity 30. In addition, air can be exhausted from the cavity 30 equally well to the aerodynamic channel 24, to the outside thereof, or indeed in line with the top platform 16 (as shown in FIG. 1).

Furthermore, it should be observed that the presence of these holes 46 in the upstream end 32 of the top platform makes it possible to avoid the air feeding this cooling circuit also feeding the cooling circuit of the fixed vane 14. This makes it possible to avoid feeding the cooling circuit of the fixed vane with air that has previously been heated while cooling the top platform.

Figure 3:
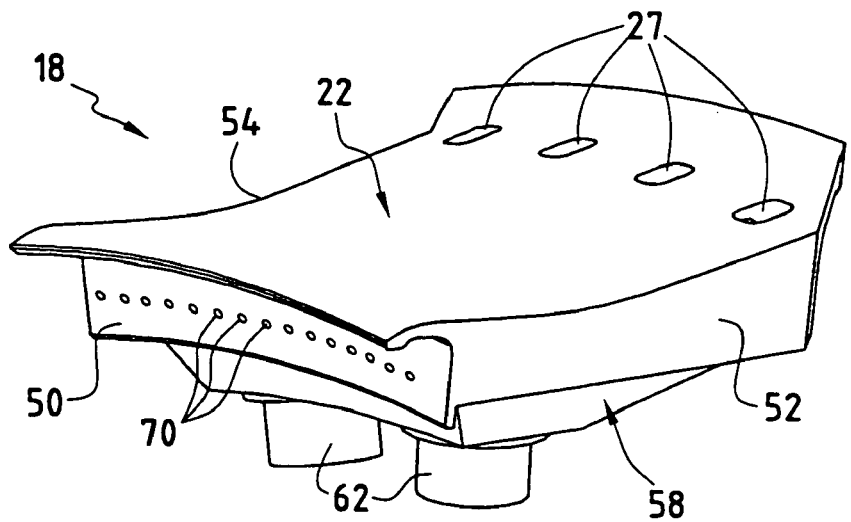
FIG. 3 is a perspective view of a nozzle bottom platform of the invention.
Figure 4:
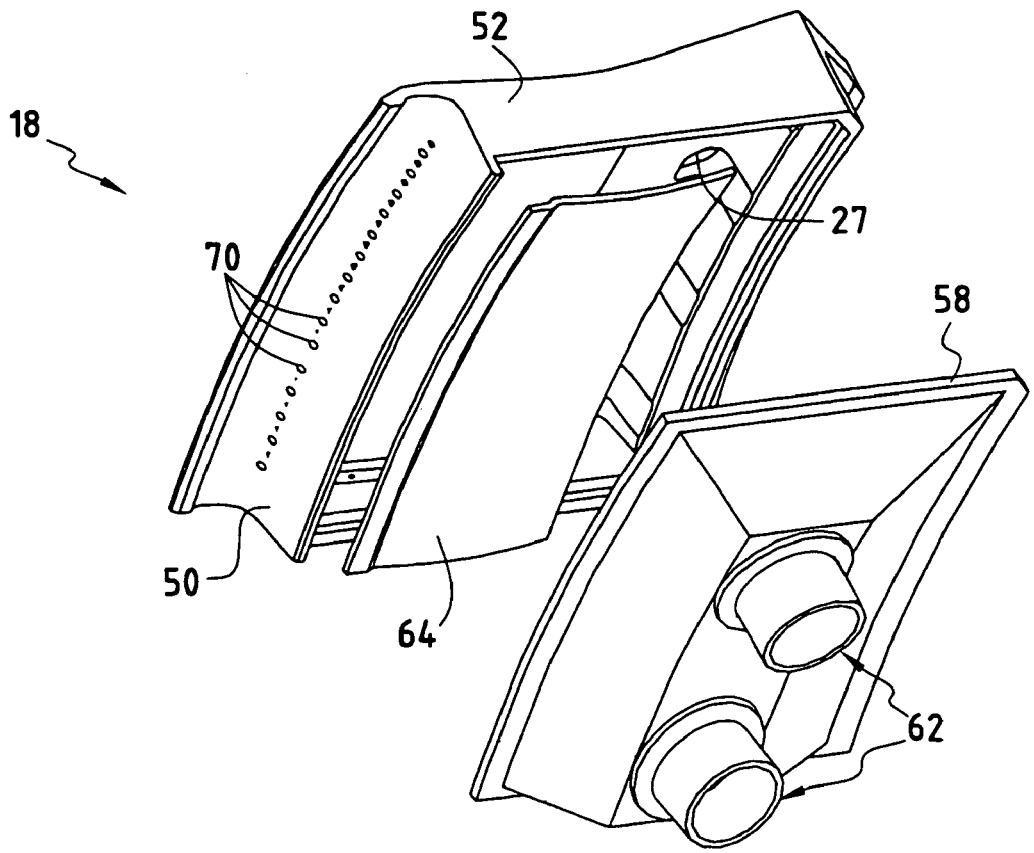
FIG. 4 is a perspective and exploded view of the bottom platform of FIG. 3.

There follows a description of the cooling circuit suitable more particularly for fitting to the upstream portion 18b of the bottom platform 18 of the nozzle, with reference in particular to FIGS. 1, 3, and 4.

This cooling circuit likewise comprises a cooling air flow cavity or enclosure 48 which extends longitudinally along the upstream portion 18b of the bottom platform 18 between an upstream end 50 thereof and the leading edges 14a of the fixed vanes 14. In FIG. 1, this enclosure 48 extends further, i.e. to between the leading edges 14a and the trailing edges 14d of the fixed vanes 14. As for the top platform, the bottom platform 18 shown in FIGS. 3 and 4 is a platform segment supporting four fixed vanes (not shown). The enclosure 48 also extends between the two tangential ends 52, 54 of the bottom platform so that the cooling air present in this enclosure covers a maximum area of the bottom platform.

The cooling enclosure 48 of the bottom platform may also be obtained by forming a recess 56 in an inside portion of the platform and covering it with a closure device. The closure device of the enclosure may be formed by a piece of sheet metal 58 brazed or welded to the upstream and tangential ends 50, 52, and 54 of the platform and to a hook 60 for attaching the platform to an air injection plate (not shown) provided for feeding a turbine disk cooling circuit. Under such circumstances, the closure sheet metal is provided with an opening for passing at least one connection bushing 62 (two bushings shown in FIGS. 3 and 4) for feeding the injection plate with cooling air. The cooling air from the fixed vane 14 is exhausted through the base 14c of the vane via the orifice 27 passing through the bottom platform 18 so as to feed the enclosure 48 with cooling air and then feed the injection plate via the link bushings 62. It should be observed that with such a configuration, it is possible to cause the axis of the cooling air exhaust orifice 27 from the fixed vane to be almost in alignment with the link bushings 62 for feeding the plate with cooling air, thereby enabling head losses to be minimized. This configuration also makes it possible for the number of link bushings to be smaller than the number of exhaust orifices (in prior techniques, each air exhaust orifice corresponds to one link bushing of the plate).

Furthermore, inside the enclosure 48, a deflector 64 is advantageously placed parallel to the downstream portion 18b of the bottom platform so as to form an annular channel 66 between the deflector and the platform. This annular channel 66 serves to improve cooling of the upstream portion 18b of the bottom platform 18 by channeling the air along the outside surface thereof. The deflector 64 may be a piece of sheet metal brazed or welded to the upstream end 50 of the platform and extending parallel to the outside surface of the bottom platform between said upstream end and an upstream wall of the orifice 27. In particular, it is preferable for this deflector not to extend beyond the upstream wall of the exhaust orifice so as to avoid disturbing the flow of air exhausted through the orifice. At its free end, the deflector 64 may have a portion 68 bent in the flow direction of the air coming from the orifice 27 feeding the enclosure. This bent portion serves to guide the air exhausted from the fixed vane 14 towards the annular channel 66. Finally, it may be necessary to provide the annular channel 66 with baffles (not shown in the figures) disposed perpendicularly to the air flow direction within the cavity so as to increase heat exchange between the cooling air and the platform.

The air feeding the annular channel 66 is then exhausted or purged via at least one hole 70 (a plurality of holes in FIG. 4) opening out into the channel and leading to the outside of the bottom platform. The or each hole 70 is formed through the upstream end 50 of the platform. These holes are also calibrated so as to ensure a regular air flow rate in the annular channel. Furthermore, air can be exhausted equally well towards the aerodynamic channel 24, towards the outside thereof, or else in line with the bottom platform (as shown in FIG. 1).

It will also be observed that the holes 70 make it possible to avoid feeding the turbine disk cooling circuit (via the injection plate) with air that has previously been heated by cooling the bottom platform.

The bottom and top platforms as defined in this way present numerous advantages. They make it possible in particular to lengthen the aerodynamic channel of the nozzle of the low-pressure turbine without adding harmful weight. The cooling circuits fitted to these platforms decrease the temperature gradients and the mean temperature on the inside surfaces thereof. Any risk of the appearance of steps harmful to the efficiency of the nozzle and of non-cooled zones leading to temperature gradients that are harmful to lifetime are thus avoided. The air feeding these cooling circuits is taken from the air for cooling the fixed vanes, but without that degrading the cooling of the vanes. It should also be observed that unlike prior art techniques, the elongated bottom and top platforms of the invention are each made as a single piece, e.g. as a casting. Similarly, the holes exhausting air from the cooling cavities of the platforms can be obtained directly by casting.

What is claimed is:

1. An annular platform for the nozzle of a low-pressure turbine in a turbomachine, said nozzle having a longitudinal axis and comprising at least one fixed vane disposed downstream from at least one moving blade of a high-pressure turbine, said platform comprising a downstream portion supporting said fixed vane radially defining an aerodynamic channel which extends longitudinally between a leading edge of said fixed vane and a trailing edge of said moving blade, said platform further comprising an upstream portion extending longitudinally beyond the leading edge of said fixed vane towards the trailing edge of said moving blade so as to lengthen said aerodynamic channel.

2. The platform according to claim 1, wherein said upstream portion includes a cooling circuit.

3. The platform according to claim 2, wherein said cooling circuit includes at least one cooling cavity extending longitudinally between an upstream end of said platform and the leading edge of the fixed vane.

4. The platform according to claim 3, wherein said cooling circuit further comprises air feed means for feeding said cavity, and air exhaust means for exhausting air from said cavity.

5. The platform according to claim 4, wherein said air exhaust means of said cavity comprise at least one hole opening out into said cavity and leading to the outside of said platform.

6. The platform according to claim 4, wherein the platform is a top platform of said low-pressure turbine nozzle, and wherein said air feed means comprise at least one orifice opening out into an air manifold for cooling the fixed vane and leading into said cavity.

7. The platform according to claim 6, wherein said air feed means comprise at least two orifices having different angles of inclination so as to distribute the cooling air uniformly within said cavity.

8. The platform according to claim 4, wherein the platform is a bottom platform of said low-pressure turbine nozzle, and wherein said air feed means comprise an orifice passing through said bottom platform for exhausting cooling air from said fixed vane.

9. The platform according to claim 8, further comprising at least one deflector disposed parallel to said upstream portion of the platform so as to form an annular cooling channel between said deflector and said bottom platform.

10. The platform according to claim 3, wherein said cavity is obtained by forming a recess in an outside portion of said platform and covering the recess with a closure device.

11. The platform according to claim 3, wherein said cooling cavity comprises baffles configured to enhance heat transfer between a cooling air and the platform.

12. The platform according to claim 3, wherein an orifice feeding cooling air from the fixed vane to said cooling cavity in the platform is substantially aligned with a link bushing air outlet disposed at a bottom portion of the platform.

13. The platform according to claim 1, wherein the platform is a top platform of said low-pressure turbine nozzle.

14. A nozzle for a low-pressure turbine of a turbomachine, the nozzle comprising a plurality of fixed vanes supported by at least one top platform according to claim 7.

15. The platform according to claim 13, wherein the top platform has an inclination of about 30°.

16. The platform according to claim 1, wherein the platform is a bottom platform of said low-pressure turbine nozzle.

17. A nozzle for a low-pressure turbine of a turbomachine, the nozzle comprising a plurality of fixed vanes supported by at least one bottom platform according to claim 16.

18. A nozzle for a low-pressure turbine of a turbomachine, the nozzle comprising a plurality of fixed vanes supported by at least one top platform according to claim 1 and by at least one bottom platform according to claim 1.

19. The platform according to claim 1, wherein the platform is a cast piece.

20. The platform according to claim 1, wherein a distance between the leading edge of said fixed vane and the trailing edge of said moving blade exceeds 80 mm.

* * * * *